United States Patent [19]

Yusko, Jr. et al.

[11] Patent Number: 4,750,708
[45] Date of Patent: Jun. 14, 1988

[54] HIGH STRENGTH BALL VALVE SEAT ASSEMBLY

[75] Inventors: Edward M. Yusko, Jr., Cleveland Heights; Richard F. Wozniak, Euclid; Peter C. Williams, Cleveland Heights, all of Ohio

[73] Assignee: Whitey Co., Highland Hts., Ohio

[21] Appl. No.: 854,814

[22] Filed: Apr. 23, 1986

[51] Int. Cl.⁴ .............................................. F16K 5/06
[52] U.S. Cl. .................................... 251/315; 251/174
[58] Field of Search ................ 251/174, 315, 316, 317

[56] References Cited

U.S. PATENT DOCUMENTS

| | | | |
|---|---|---|---|
| 3,077,332 | 2/1963 | Burtis | 251/174 X |
| 3,331,581 | 7/1967 | O'Connor | 251/174 X |
| 3,394,915 | 7/1968 | Gachot | 251/174 |
| 3,834,663 | 9/1974 | Donnelly | 251/173 |
| 4,126,295 | 11/1978 | Natalizia | 251/315 |
| 4,241,895 | 12/1980 | Sterneuberg | 251/173 |
| 4,303,249 | 12/1981 | Illy | 251/173 X |

Primary Examiner—A. Michael Chambers
Assistant Examiner—John C. Fox
Attorney, Agent, or Firm—Fay, Sharpe, Beall, Fagan, Minnich & McKee

[57] ABSTRACT

A ball valve for low and high pressure applications including a metallic seat member that toroidally deflects into sealing engagement with a ball member outer surface upon valve assembly. The seat member includes an outer circumferential rim portion and a radially inward extending frusto-conical portion. The rim portion is radially interposed between an annular, resilient flange member and an annular support member. The rim portion and resilient flange member define a behind-the-seat seal while the frusto-conical portion and support member abuttingly engage during extreme pressure conditions for added structural support. The radially innermost edge of the frusto-conical portion has an arcuate conformation to inhibit scoring of the ball member surface.

15 Claims, 2 Drawing Sheets

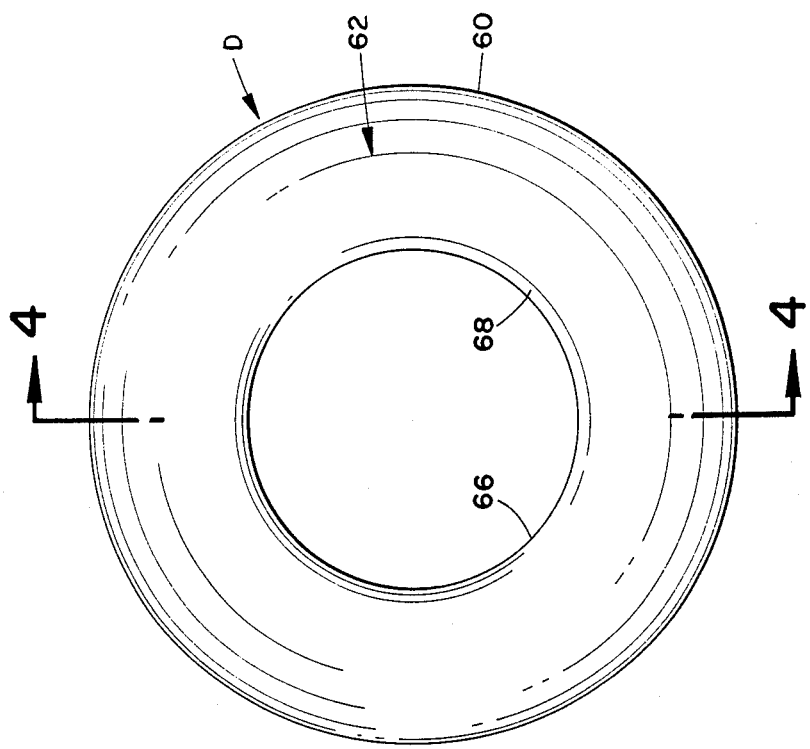
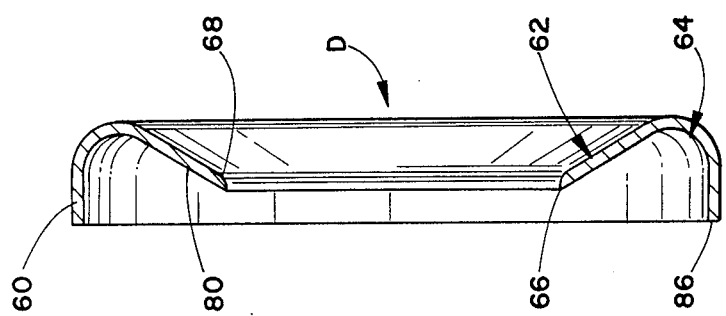

ND STRENGTH BALL VALVE SEAT ASSEMBLY

HIGH STRENGTH BALL VALVE SEAT ASSEMBLY

BACKGROUND OF THE INVENTION

This invention pertains to the valve art and, more particularly, to ball valves.

The invention is particularly applicable to a new and improved seat assembly for a ball valve of the type having a so called "floating ball" and will be described with particular reference thereto. However, it will be appreciated that the invention is capable of broader applications and may be advantageously employed in other environments.

Prior ball valve constructions as disclosed in the commonly assigned U.S. Pat. Nos. 3,894,718 and 4,410,165, the teachings of which are incorporated hereinto by reference, include a resilient seat ring construction employing disc springs for urging the seat rings into sealing contact with a ball member. The ball member is mounted for a slight amount of free movement or axial shifting when the ball member is in a valve closed position under fluid pressure conditions. Shifting of the ball member enhances downstream seat ring engagement therewith.

Typically, these valve constructions are entirely satisfactory for low and intermediate fluid pressure conditions. However, at more elevated fluid pressure conditions, especially with elevated temperatures and abrasive media, the resilient seat ring assemblies have been found to be less effective. Instead, high fluid pressure applications have generally required use of metal seats of various constructions. Certain operational problems encountered with prior metal seat designs have been remedied to some extent by matched lapping of the seat ring and ball valve member. Other remedial designs have provided a hard coating on the sealing surface of the seat ring for inhibiting degradation of the remainder of the seat ring assembly.

Although these prior arrangements have met with some success, they necessarily result in special manufacturing requirements in order to maintain close tolerances and adequate sealing in high fluid pressure conditions. Specifically, both the matched lapping and appication of a hard coating add significant costs to the valve, particularly when viewed from the standpoint of the relative benefits derived therefrom.

Additionally, other prior constructions have captured the metal seat rings between a counterhore formed in the central passage of the valve body and an end member, thereby retainingly engaging the seat ring assembly in contacting relation with the ball member. In this type of construction, the seat rings are limited in their degree of movement within the valve chamber which, in turn, limits the ability of the seat ring assembly to conform to the outer circumferential surface of the ball member. The inability of the seat ring assembly to flex for obtaining enhanced sealing engagement with the ball member, either upon valve assembly or during free movement or axial shifting of the ball member, limits sealing capabilities under extreme fluid pressure conditions.

Accordingly, it has been considered desirable to develop a new and improved seat assembly constructed from a high strength material which would facilitate better seat ring flexure and sealing at elevated fluid temperature and pressure conditions.

The subject invention is deemed to meet these needs and others in an efficient, economical manner for providing a valuable advance to the state of the art.

SUMMARY OF THE INVENTION

In accordance with the present invention, a valve seat assembly constructed of a high strength material and adapted for particular use in a ball valve used in high fluid temperature and pressure applications is advantageously provided. The seat assembly is economical to manufacture and has an enhanced sealing under extreme pressure conditions.

According to another aspect of the invention, a ball valve is provided which includes a valve body having a fluid flow passageway operatively communicating with generally opposed sides of a valve chamber. A ball member is disposed in the valve chamber for selective rotation between valve open and closed positions. A seat assembly includes an annular seat member having an outer circumferential rim portion and a generally frusto-conical portion extending radially inwardly therefrom. The frusto-conical portion has a conformation which provides annular band contact with the ball member when the seal assembly is in place in the valve chamber. Further, an annular resilient ring or member is received in the valve chamber in sealing engagement with the exterior of the rim portion.

According to another aspect of the invention, an annular support ring or member is disposed along a radial inner surface of the rim portion.

In accordance with a further aspect of the invention, the annular support member is spaced a predetermined distance from the frusto-conical portion in a first pressure condition of the valve and engagingly supports the deformed frusto-conical portion in a second, extreme pressure condition.

In accordance with a further aspect of the invention, the radial innermost free edge of the frusto-conical portion has an arcuate conformation for inhibiting undesired scoring of the ball member.

According to a more detailed aspect of the invention, the seat member is of metallic construction.

The principal advantage of the subject invention is the provision of a valve seat assembly which is economically constructed from a high strength material and particularly suited for use in high fluid pressure applications.

Another advantage of the invention is realized in the provision of a simplified seat assembly structure.

A further advantage of the invention resides in radial capture of the seat member that allows limited movement so that the seat member toroidally deflects upon valve assembly.

A further advantage of the invention is found in a toroidal deflection of the seat member under extreme pressure conditions that enhances sealability.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 3 is a view of the seat member taken in the direction of the sealing face; and, FIG. 4 is a cross-sectional view taken generally along lines 4—4 of FIG. 3.

DETAILED DESCRIPTION OF THE PREFERRED EMBODIMENT

Figure 1:
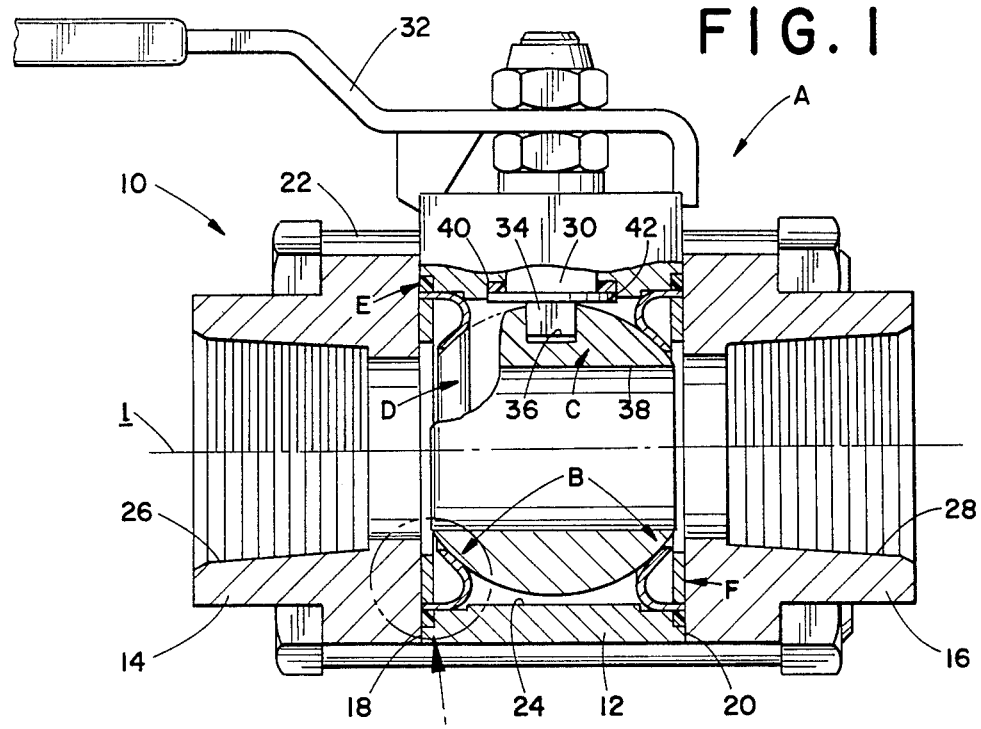
FIG. 1 is a partial cross-sectional view of a ball valve construction incorporating seat assemblies formed in accordance with the subject invention.

Referring now to the drawings wherein the showings are for purposes of illustrating the preferred embodiment of the invention only and not for purposes of limiting same, FIG. 1 shows a ball valve A having a pair of seat assemblies B on opposite sides of a floating type spherical ball member C.

More particularly, a valve body 10 includes a central body section 12 and a pair of end members 14, 16 defining end faces or shoulders abuttingly engaging the body section. The end members 14, 16 matingly engage opposed end faces 18, 20 of the central body section and are sealingly retained thereagainst by conventional fastening means such as elongated bolts 22 or the like. A central cavity or valve chamber 24 is defined in the body section 12, and passageways 26, 28 are defined in end members 14, 16, respectively, for fluid communication with the valve chamber 24 generally along longitudinal axis 1. As shown, the passageways are threaded for receipt of conventional pipe couplings or the like; however, it will be readily appreciated that the end members 14, 16 may be adapted to accommodate other types of conventional connections without in any way departing from the scope and intent of the subject invention.

A rotary valve member or ball C is received in the valve chamber and disposed for selective rotation between valve open and closed positions by a stem 30 and actuating handle 32. The valve stem 30 penetrates the upper portion of central section 12 and has a lower end or tang 34 received in a slot or groove 36 formed in the ball member C. In this manner, the ball member is rotatably actuated between open and closed positions. Cooperation between the tang and groove permits only limited axial movement of the ball member in the valve closed position. More particularly, and as is known, a ball member central passage 38 is aligned with passageways 26, 28 in the valve open position and generally perpendicular thereto in the valve closed position. A stem bearing 40 is interposed between a valve stem flange 42 and the central body section 12. The stem bearing maintains smooth, rotative contact between the valve stem and body.

Although not shown in detail, it is to be understood that conventional stem packing or sealing means are provided intermediate the valve stem and central body section 12. Similarly, a conventional actuating means such as a handle 32 is disposed at an outer end of the valve stem for imparting rotational movement thereto. Of course, other actuating means can be used with equal success without departing from the inventive aspects of the present invention. Since the stem packing and actuating handle do not form a specific portion of the subject invention, further discussion is deemed unnecessary to a complete understanding of the invention.

The central body section 12 includes axially extending annular grooves or counterbore pairs 48, 50 (FIG. 2) disposed at each opposed end section thereof and in facing relation with the end members 14, 16. The counterbores 48 have a greater diameter than their associated counterbores 50. More specifically, the counterbores 48 extend axially inward from end faces 18, 20 of the central body section. Each counterbore 50, in turn, extends axially inward from its respective counterbore 48 and has an axial dimension greater than the counterbore 48. In the preferred embodiment, here under discussion, the counterbore pairs 48, 50 are identical and thus define stepped configurations.

The counterbores closely receive the seat assemblies B for sealing engagement with the ball member C. With reference to all of FIGS. 1–4, each seat assembly is comprised of three major components comprised of a seat member D, a resilient flange member or seal E, and an annular support member or backseat F, and these components are generally concentrically arranged about longitudinal axis 1. Since the seat assemblies at opposed ends of the valve chamber are identical, the following description of the left hand seat assembly, as shown in FIGS. 1 and 2 is deemed to apply equally to the right hand seat assembly unless otherwise specifically noted.

The annular seat member D includes a circumferential rim portion 60 and a generally frusto-conical portion 62. The frusto-conical portion extends radially inward relative to the circumferential rim portion in its free, unassembled state as shown in FIGS. 3 and 4. A curvilinear interconnecting portion 64 is intermediately disposed between the rim portion and frustoconical portion of the seat member. The cross-sectional conformation of the interconnecting portion will change upon toroidal deflection of the seat member as will become more apparent below.

A free inner edge 66 associated with the outer face or surface of seat member D defines the inner diameter of the member, and a generally arcuate surface 68 communicates between edge 66 and the forward face of the seat member in facing relation with the ball member. As illustrated in FIG. 4, the outer rim portion 60 defines a generally planar first leg portion in cross-section. Similarly, the frusto-conical portion 62 defines a second leg portion with the curvilinear interconnecting portion 64 extending between leg portions 60, 62.

Figure 2:
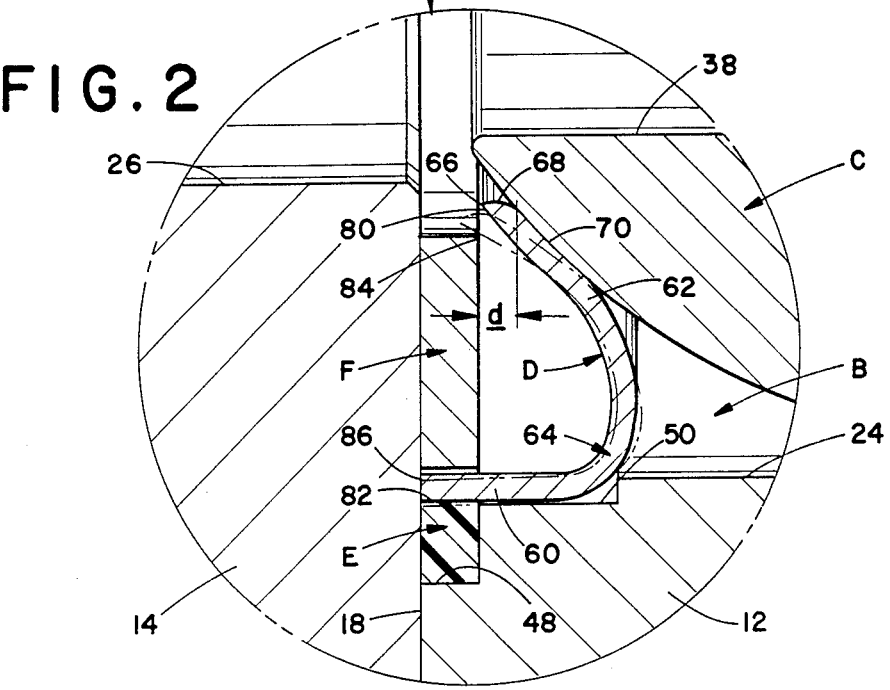
FIG. 2 is an enlarged, detailed view of the encircled portion of FIG. 1 particularly illustrating the seat ring assembly in a normal position in sealing engagement with the ball member with an extreme pressure seat assembly position being shown in phantom.

As shown in FIGS. 1 and 2, the resilient flange member or seal E is closely received within the counterbore 48. This annular member has an inner diameter which is slightly less than the diameter of counterbore 50 and an outer diameter which is substantially the same as counterbore 48. Therefore, when flange member E is received in counterbore 48, a portion thereof extends radially inward beyond the boundary defined by counterbore 50.

The annular support member or backseat F is interposed radially between rim portion 60 and passageway 26. Further, the support member abuts end member 14 and has a radial dimension adapted to abuttingly support the frusto-conical portion 62 during high fluid pressure conditions as will be described in greater detail hereinbelow.

The seat member D is positioned in the valve chamber such that the circumferential rim or first leg portion 60 is received in the counterbore 50 so that the radial outer surface of portion 60 engages the resilient flange member E at the inner diameter surface thereof. In the valve open position of FIG. 1, the axially extending rim portion defines a slight, predetermined gap between its outer radial surface thereof and the axially extending side wall of groove 50. The seat member D is toroidally deflected upon valve assembly or make-up so that the seat member exerts a predetermined biasing force against the ball member C. Additionally, the seat member, particularly the frusto-conical portion 62, flexes to conform to the spherical surface of the ball member, thereby overcoming surface irregularities thereon. The frusto-conical portion includes a sealing surface 70 that defines a region of annular band contact with the outer circumferential surface of the ball member. This sealing surface extends radially outward from the seat member arcuate surface 68 and matingly engages the ball member surface.

As illustrated in FIGS. 1 and 2, the ball member is in the open position so that the central passageway 38 is axially aligned with passageways 26, 28 in the end members. In this position, a support area 80 adjacent inner edge 66 on the outer face of the frusto-conical portion 62 is spaced from support member F while sealing surface 70 is disposed in sealing engagement with the outer surface of the ball member. As best seen in FIG. 2, the arcuate surface 68 curves away from the sealing surface 70 toward edge 66 to thereby prevent scoring of the ball member that might otherwise occur if a sharp edge was included at the radial innermost extent of surface 70.

The support member F and the resilient flange member E radially confine the seat member D therebetween. The flange member, as indicated above, is formed of a pliable or resilient material so that toroidal deflection of the seat member during valve assembly and at the time of extreme fluid pressure conditions creates a behind-the-seat seal. More particularly, the radial outer surface of the circumferential rim portion 60 sealingly engages and compresses inner diameter surface portion 82 of the resilient flange member. A radially inner surface of the rim portion faces an outer peripheral portion of the support member. During valve assembly, and during high pressure conditions in the valve closed position when the ball member undergoes limited axial shifting, the seat member toroidally deflects so that the resilient flange member E is further compressed at surface portion 82 by the rim portion 60.

The support member and frusto-conical support face 80 define a gap or dimension d therebetween in the valve open position. In this position, any axial load imposed by the ball member and fluid pressure is adequately compensated for by the seat member. The original deflection of frusto-conical portion 62 during valve assembly or make-up defines a region of annular band contact with the ball member as described above for adequate sealing purposes. In a valve closed position and as fluid pressure increases, the ball member axially shifts downstream under the influence of increased loading. The downstream seat member, therefore, further toroidally deflects to a position where the seat member support face 80 abuttingly engages the support member F at an inner diameter portion 84 thereof. This abutting engagement advantageously adds structural support to the seat member during extreme fluid pressure conditions. Thus, the seat assembly is resilient enough to effectively seal at low pressure conditions and is strong enough to retain high pressure. Additionally, the area of annular band contact of sealing surface 70 with the outer circumference of the ball member is increased under the high pressure, valve closed condition.

As the downstream seat member of the preferred embodiment shown in FIG. 1 is toroidally flexed in response to shifting of ball member C, the upstream seat member flexes toward and along with the ball. This result is achieved by the fact that at valve make-up under no fluid pressure conditions, the valve components are dimensioned so that both seat members D are flexed outwardly away from each other in response to contact with the ball members. Thus, each seat member has a certain amount of spring reserve in a no fluid load condition so that the upstream seat member will flex inwardly as the ball shifts slightly downstream. The amount of spring reserve provided is predetermined so that the upstream seat will not disengage from the ball member, even at the maximum extent of ball shift downstream. Under this condition, the area of band contact between the upstream seat member and ball member at sealing surface 70 may narrow somewhat; however, again, some contact is always retained.

As noted above, the seat member of the subject invention exerts a biasing force against the ball member as it is deflected from its at rest configuration upon valve assembly. The seat member is subjected to only radial constraints by the resilient flange member E and the support member F, thereby allowing toroidal deflection during varying operative conditions. An axial end 86 of the rim portion abuts the associated end member 14 or 16 to limit axial outward movement, but the seat member is not restrained on its axial inner face except by the ball member. Such arrangement allows the seat member to toroidally deflect in the manner and for those reasons hereinabove described.

Preferably, the seat member D is formed from metal or similar high strength material. The simplified construction of the seat member allows it to be formed from an inexpensive stamping operation. The elastic nature of the metal seat member imposes a biasing force on the ball member during valve assembly and readily conforms to the outer surface of the ball member. This eliminates any need for special materials at or along the sealing surface 70, or for matched lapping between the seat member and ball.

The invention has been described with reference to the preferred embodiment. Obviously, modifications and alterations will occur to others upon a reading and understanding of this specification. It is intended to include all such modifications and alterations insofar at they come within the scope of the appended claims or the equivalents thereof.

Having thus described the invention, it is now claimed:

1. A ball valve comprising:
   a valve body having first and second passageways disposed along a longitudinal axis and communicating with a valve chamber at opposite sides thereof;
   a ball member disposed in said chamber for selective rotation between a valve closed position and a valve open position allowing fluid flow between said first and second passageways;
   a seat assembly disposed in said chamber in sealing engagement with said ball member generally concentric with said longitudinal axis, said seat assembly including:
   (i) an annular seat member having an axially extending rim portion at generally the outer circumference thereof, and a generally frusto-conical portion extending generally radially inward from said rim portion and having a first surface sealingly engaging an outer circumferential surface of said ball member, (ii) an annular resilient member disposed in surrounding engaging relation with said seat member rim portion along a radially outer surface thereof, and (iii) an annular support member disposed so that the outer periphery thereof is in facing relation to a radially inner surface of said seat member rim portion, said support member adapted to be selectively engaged by said frusto-conical portion at a radially inner area of said support member oppositely disposed from said first surface to provide a predetermined positive limit for deflection of said frusto-conical portion.

2. The ball valve as defined in claim 1 wherein a radially inner edge surface of said frusto-conical portion is of generally arcuate conformation.

3. The ball valve as defined in claim 1 wherein said seat member is of metallic construction.

4. The ball valve as defined in claim 1 wherein said annular resilient member is closely received in a first counterbore in said valve chamber.

5. The ball valve as defined in claim 4 wherein said rim portion is closely received in a second counterbore in said valve chamber.

6. The ball valve as defined in claim 5 wherein said resilient member has a radial dimension greater than said first counterbore whereby said rim portion is spaced radially inward from said second counterbore.

7. A ball valve comprising:
a body section having a cavity defined therein;
a ball member including a flow passage therethrough, said ball member being mounted in said cavity for selective rotation between valve open and valve closed positions to control fluid flow through said valve, said ball member further including a generally spherical outer surface;
a pair of shoulders operatively engaging said body section on opposite sides of said ball member, each shoulder having a passageway defined therethrough for fluid communication with said cavity;
a pair of seat assemblies positioned in said cavity on opposite sides of said ball member for sealing engagement therewith, each of said seat assembly pair including:
an annular seat member having an axially extending rim portion at generally the outer circumference thereof, a generally frusto-conical portion extending radially inward from said rim portion and having an annular portion thereof in sealing contact with said ball member,
an annular resilient member disposed in surrounding engaging relation with said seat member rim portion along a radially outer surface thereof, and
an annular support member disposed so that the outer periphery thereof is in facing relation to a radially inner surface of said seat member rim portion, said support member adapted to be selectively engaged by said frusto-conical portion at a radially inner area of said support member oppositely disposed from said first surface to provide a predetermined positive limit for deflection of said frusto-conical portion.

8. The ball valve as defined in claim 7 wherein said body section includes a first pair of counterbores on opposite sides of said ball member, each first counterbore closely receiving a seat member rim portion therein.

9. The ball valve as defined in claim 8 wherein said body section includes a second pair of counterbores on opposite sides of said ball member, each second counterbore closely receiving an annular resilient member therein.

10. A ball valve comprising:
a valve body having first and second passageways communicating with a valve chamber therein;
a ball member disposed in said valve chamber for selective rotation between a valve closed position and a valve open position allowing fluid flow between said first and second passageways; and,
a seat assembly disposed in said valve chamber adjacent said first passageway for sealingly engaging said ball member, said seat assembly including an annular seat member having first and second leg portions angularly disposed relative to each other, an annular resilient member abuttingly engaging said first leg portion, said resilient member adapted to be radially compressed in response to toroidal deflection of said seat member, and an annular support member spaced from said second leg portion in a first pressure condition of said valve and supportingly engaging said second leg portion in a second pressure condition.

11. The ball valve as defined in claim 10 wherein said annular band contact increases with an increase in outward toroidal deflection of said second leg portion.

12. The ball valve as defined in claim 10 wherein said seat member includes an intermediate curvilinear portion interposed between said first and second leg portions.

13. The ball valve as defined in claim 10 wherein said seat member is of metallic construction.

14. The ball valve as defined in claim 10 wherein said second leg portion includes an arcuate inner diameter edge surface.

15. A ball valve comprising:
a valve body having first and second passageways communicating with a valve chamber therein;
a ball member disposed in said valve chamber for selective rotation between a valve closed position and a valve open position allowing fluid flow between said first and second passageways; and,
a seat assembly disposed in said valve chamber adjacent said first passageway for sealingly engaging said ball member, said seat assembly including an annular seat member having first and second leg portions angularly disposed relative to each other, an annular resilient member abuttingly engaging said first leg portion, said resilient member adapted to be radially compressed in response to toroidal deflection of said seat member, and an annular support member concentric with said resilient member and spaced radially inward therefrom, said support and resilient members receiving said first leg portion therebetween.

* * * * *